Sept. 29, 1936.  S. S. GREEN ET AL  2,055,687
ELECTRIC METER
Filed June 29, 1934    3 Sheets-Sheet 1
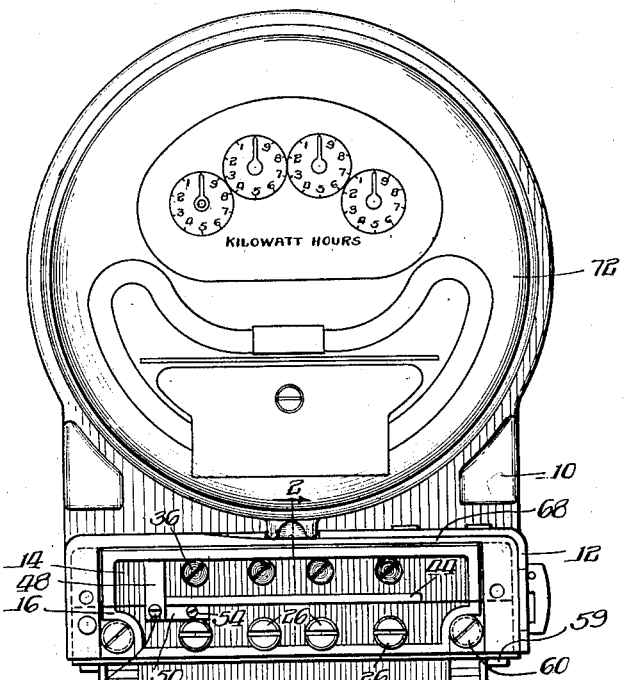
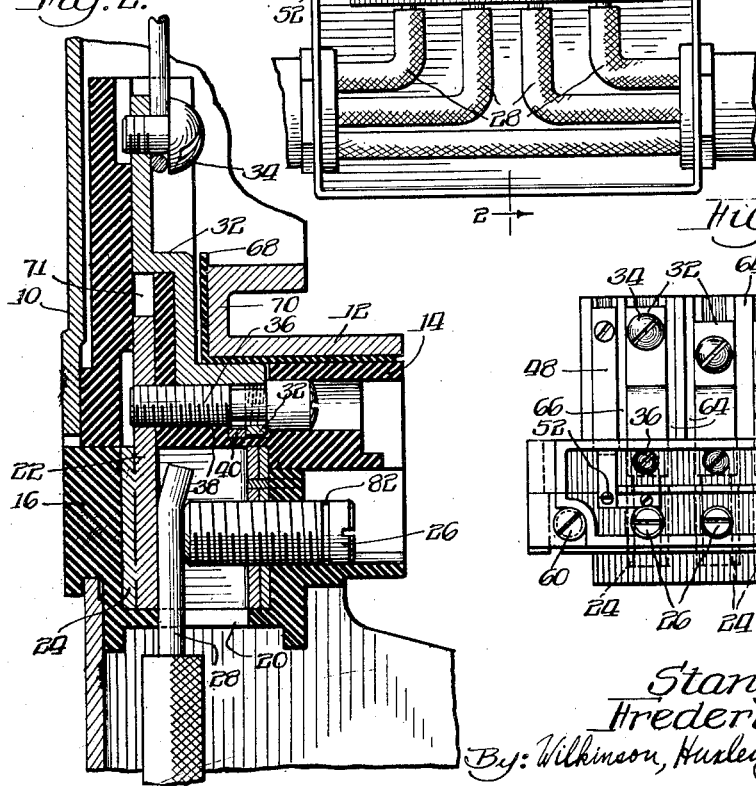

Sept. 29, 1936.   S. S. GREEN ET AL   2,055,687
ELECTRIC METER
Filed June 29, 1934    3 Sheets-Sheet 2
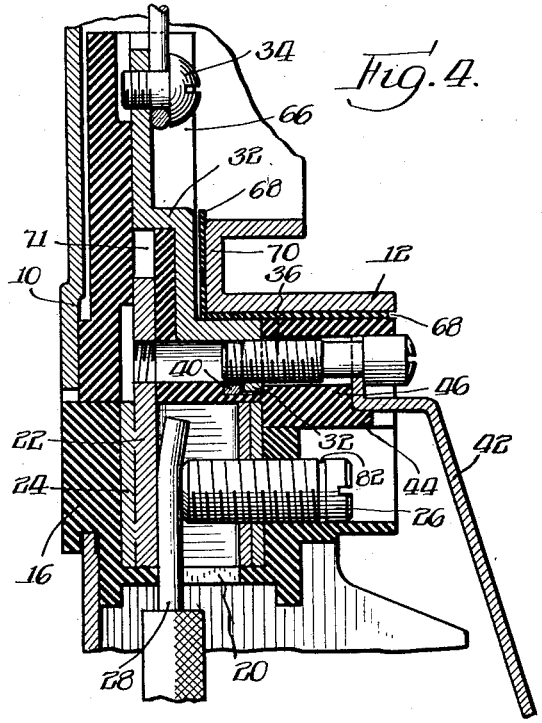
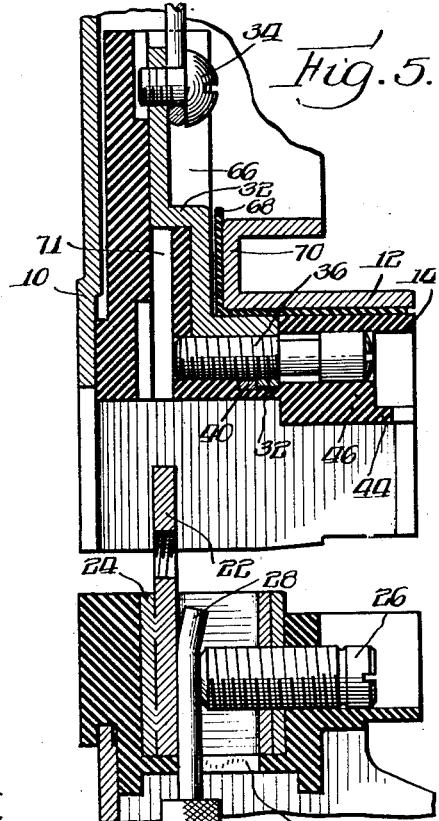
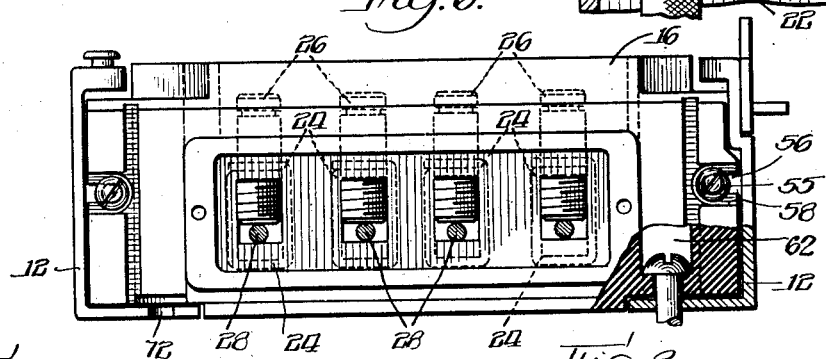
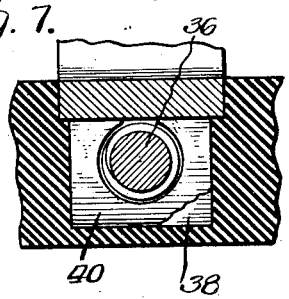
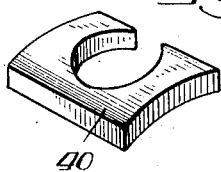
Inventors
Stanley S. Green
Frederick Holmes
By: Wilkinson, Huxley, Byron & Knight
Attys.

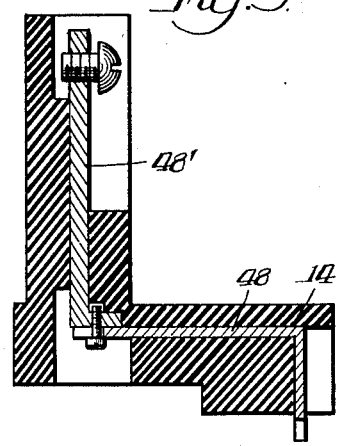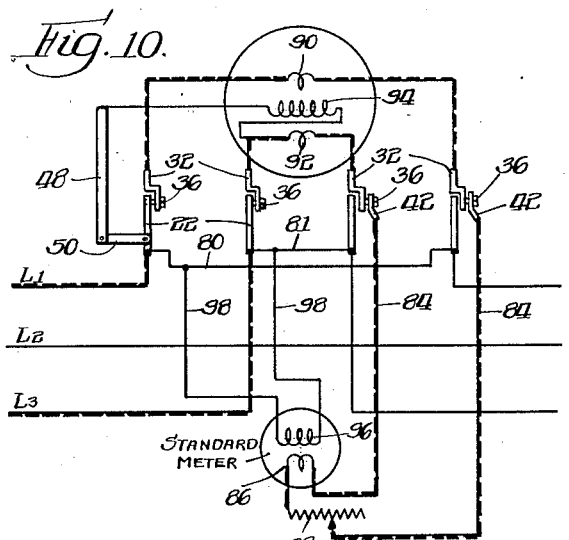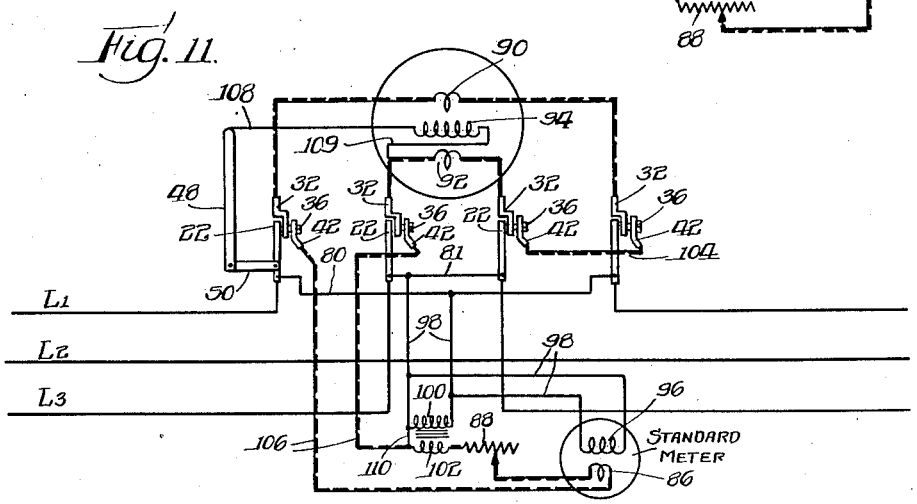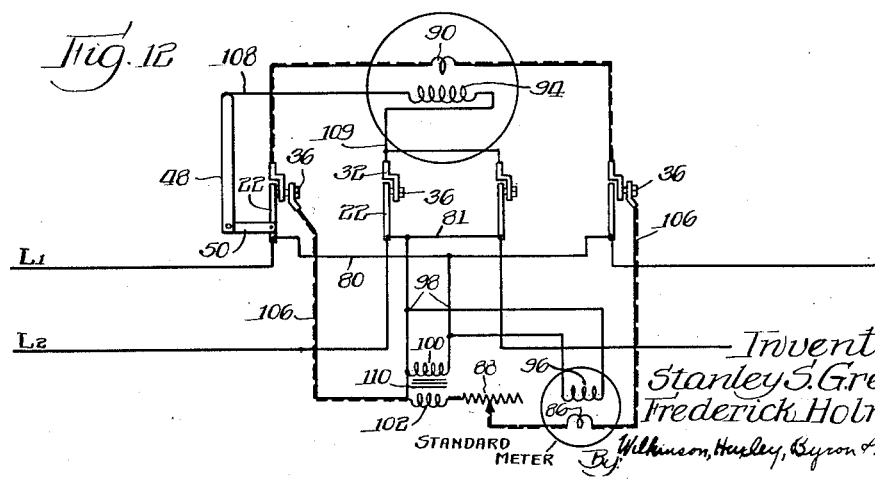

Patented Sept. 29, 1936

2,055,687

UNITED STATES PATENT OFFICE 2,055,687

ELECTRIC METER

Stanley S. Green and Frederick Holmes, La Fayette, Ind., assignors to Duncan Electric Mfg. Co., La Fayette, Ind., a corporation of Illinois Application June 29, 1934, Serial No. 733,058

16 Claims. (Cl. 175—183)

This invention relates to electric watthour meters and more particularly to the combination of such a meter with its casing, commonly called a base, and with a connecting block therein which is provided with satisfactory disconnect features for temporarily breaking certain connections between the meter and the measured circuit.

In commercial watthour meters it is frequently desirable to disconnect a meter from the wires connected thereto without disturbing these wires. The purpose of the disconnection may be to discontinue service, to remove the meter or to test it while it is installed. One of the simplest tests consists in leaving the meter connected to the supply lines but disconnected from the usual load lines, and connecting a standard meter (that is a meter of known accuracy) in circuit with the meter to be tested, and comparing the two meters under different loads. Although knowledge of the particular connections is not important for understanding the present invention, it is important to realize that in watthour meters it is frequently desirable in some way to disconnect the meter temporarily from certain wires leading out therefrom and to connect it instead to special wires which are concerned with the test. Obviously this substitution of wires may be made by loosening the screws which secure the wires in question, and removing the wires. Heretofore many meters have had no other disconnect provision. Other commercial meters have had special connect features installed with them but exterior of the meter base. Such combinations or sets are more expensive, are larger, and require a large meter base or larger pull box or connection box associated with them if the installation is to be safe and well wired. Necessity for a larger housing introduced further expense and often great inconvenience, but it was the inevitable consequence of the additional room heretofore required by practical commercial disconnect features. For years some of the best minds of the industry have endeavored to solve the problem of providing the disconnect features in the space normally provided for the simple connection block without disconnect features. Heretofore they have all been baffled in their attempts to find a commercially satisfactory solution for the problem. Patent No. 1,906,927 issued May 2, 1933 to Stanley S. Green, one of the present inventors, discloses a structure which would be very satisfactory under certain conditions, but because it is not satisfactory in all meters under all conditions, it fails to be a complete solution. The problem is not so simple as the present invention makes it appear, and, as a matter of fact, the necessity for such extreme simplicity of construction was one of the points which in the years past have baffled the engineers. Another requirement on account of which the problem has defied solution heretofore is the necessity for perfect or nearly perfect connections when the meter is in use. Many of the meters now used must be capable of carrying 150 amperes continuously. This means therefore that the connections in the disconnect feature must be capable of carrying 150 amperes without undue heating. To get such a good contact dependably a very high pressure is essential, and it must be obtained without danger of splitting associated parts. One of the major improvements of the present invention over that of the prior patent above referred to is that here the force is exerted in a compressing direction while there it is exerted in an expanding direction, which necessarily has some tendency to split the surrounding parts when the pressure is extreme.

In addition to the foregoing requirements, there must be a provision for making the test connections with the meter element when its usual connections have been disconnected. Furthermore, the structures should be foolproof to the extent that there is no danger of the tester starting a test in the belief that a disconnect has been accomplished when it has not.

It is therefore the general object of the present invention to solve the problem of providing in a meter base a connection block with satisfactory disconnect features, but which takes up little or no more space than the ordinary connection block without the disconnect features. To solve this problem it has further been the object to meet all of the requirements, namely, extreme simplicity, both for the sake of staying within the space allowed, and for the sake of low cost and operating simplicity; high contact pressure free from the formerly attendant dangers of rupture by said pressure; foolproof disconnect characteristics; and of course a practical low cost construction. It may be mentioned that although the general object of the invention is to solve the problem by accomplishing each of the requirements, yet there are also many specific objects, each being to overcome satisfactorily one or a small combination of the requirements. It is also an object of the invention to provide a connection block as already described which is separable to form two terminal blocks, one for the meter element, the other for the circuit. Furthermore, it is desirable that the meter and its connection block be interchangeable with corresponding sets at present in use, and that the connection blocks be made to fit meters now in use.

A further object is to provide, especially with the compactness allowed by the preceding objects, a potential connection which is not disconnected by the disconnect screws in order to facilitate certain tests which will be described, especially the phantom load test.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a front view of the embodiment of the invention chosen for illustration, the cover plates being removed for visibility;

Figure 2 is a fragmentary sectional view taken through the line 2—2 of Figure 1;

Figure 3 is a front view of the terminal block alone;

Figure 4 is a view corresponding to Figure 2 but showing the parts in their disconnect position with the attachments provided for testing;

Figure 5 is a view somewhat similar to Figure 3 but showing the meter and the upper part of the connection block from the lower part of the connection block;

Figure 6 is a bottom view of the connection block alone;

Figure 7 is a fragmentary sectional view taken through one of the disconnect screws;

Figure 8 is a perspective view of the crimped washer seen in Figure 7;

Figure 9 is a sectional view of the inner terminal block of the potential strap; and Figures 10 to 12 are diagrammatic views showing some circuits and connections for testing.

Although this invention may take other forms, only one has been chosen for illustration. According to this form, the meter base 10 is provided with a terminal chamber 12 which is open along its bottom and front sides. Within this chamber is located what may generally be called the connection block, although it is preferably but not necessarily in two parts, namely the inner terminal block 14 connected to the meter element, and the outer terminal block 16 connected to the circuit wires. These two sections are separable, as will be more fully described hereinafter. The outer terminal block 16 aside from its fittings, comprises a frame made of the material known commercially as bakelite or other suitable insulating material, preferably by molding. The block has suitable conductor holes 20 passing vertically therethrough, also suitable holes for the screws that are described hereinafter. In each of the holes 20 may be located a circuit terminal strap 22, preferably a heavy copper bar which has been illustrated lying within a clamp casing 24 which may be made of steel or other strong rigid metal. Screwed into the front of this clamp casing is a heavy screw 26 which is preferably made of steel, and which passes through the front of the connection block so as to be readily accessible, as shown in Figure 1. All parts made of steel or other rustable metal may be protected against rust as by cadmium plating. Into each of the casings 24 between the screw 26 and the strap 22 may be inserted a wire 28 from the circuit in which the meter is placed, the wire being clamped firmly against the strap by screwing the screw 26 into the casing 24 as shown in Figure 2. Although the arrangement of the wires will depend on the internal wiring of the meter, we may consider the first and second wires from the left in Figure 1 as being input, i. e. line wires, and the others, which we may call the third and fourth, as being output, i. e. load wires.

The inner terminal block 14 also comprises, aside from its fittings, a frame made of bakelite or other insulating material, as in the case of the outer terminal block 16. This block 14 is shaped to fit snugly above the block 16, and it may interlock therewith to some extent. Carried by the inner terminal block 14 are the inner terminal straps 32 provided with suitable binding posts or screws 34, as shown. These inner terminal straps 32 do not directly contact the terminal straps 22, and in fact, may be completely insulated therefrom, except for screws 36, which, for the reasons hereinafter brought out, may be called the disconnect screws. Since these screws carry the current they are preferably made of an alloy having low resistance as well as great strength. One such alloy comprises copper with a small amount of beryllium, and is available on the open market.

Each of the inner terminal straps 32 is provided with one of the disconnect screws 36 which is shaped as clearly shown in Figure 2. The screw 36 in its normal position passes loosely through a threaded hole in the lower end of the inner terminal strap, and normally screws into a threaded hole in the outer terminal strap 22. It will be noticed that each of the screws 36 is formed with an annular recess adjacent its head so that in the position shown in Figure 2 it has no threaded engagement with the inner terminal strap 32. It follows, therefore, that its head bears against the front of the connecting strap and presses thereon in a direction toward the outer terminal strap 22. The inner terminal strap 32 and the outer terminal strap 22 are held spaced apart by such portions 38 of the molded inner terminal block 14 as may lie between the two straps 22 and 32. These portions 38 may be called for convenience an insulating bar, or if contemplated as to one pair of straps only such portion may be referred to as insulating pillars. The bar or pillar 38 preferably makes a fairly snug fit with the screw 36, almost surrounding it. The bar or pillar 38 should be of such compressional strength that the screw 36 may be screwed down with extreme firmness so that there will be a high contact pressure between the head of the screw 36 and the inner terminal strap 32. If the insulating bar 38 is made of bakelite or any other material which has a slight tendency to creep under pressure during the passage of time and under various temperature conditions, a crimped washer or horseshoe-shaped plate 40 or other such device may be placed between the insulating bar 38 and either the inner terminal strap 32 or outer terminal strap 22. It is preferred that the crimped washer be made of fairly elastic steel and that it be sufficiently heavy and strong to exert several or even many pounds force, adequate tension being maintained through say a hundredth of an inch of the compressional range which may be several hundredths of an inch. It is believed that the creeping effect of the bakelite will be much less than a hundredth of an inch, but whatever it is the washer should be capable of full compensation with adequate tension. The hole through the crimped washer should preferably be large enough to permit the screw to pass freely therethrough, and of course it need not be horseshoe-shaped unless the position of the inner terminal strap so requires. The inner terminal block 14 may be molded with a cavity large enough to accommodate the expansion of crimped washers 40, or they may be kept under pressure, as may be preferred. Also, instead of using the crimped washer the pillar 38 may be replaced by an insert of an insulating material which does not creep, such as porcelain, or each by a separate insert.

In making a disconnect, the screw 36 is unscrewed until its threaded portion engages the inner terminal strap 32 which is threaded for this purpose. The screw is then in screwing engagement with both terminal straps and is further unscrewed until it passes out of contact with the outer terminal strap 22. The disconnect screw 36 should be short enough so that at this time its head has not yet protruded from the hole in the front of the inner terminal block 14 in which the screw operates. This makes it impossible to clip or otherwise secure a test wire to the disconnect screw until the disconnection has been completed.

Upon continued unscrewing, the head of the disconnect screw 36 passes entirely out of the hole in frame 30 thereby at once indicating that the disconnection is complete, and also permitting the insertion of a test wire or preferably a special test connection bar 42 under the head of the screw 36. The preferred shape and arrangement of this test connection bar is shown in Figure 4, although it may be mentioned that it is provided with a slot open at its top so that the bar may be slipped under the head of screw 36 to the position shown in Figure 4. It should be noted that the inner terminal block 14 is preferably provided with a projecting ledge 44 which prevents the twisting of the test connection bar 42 and also prevents it from slipping downwardly and out of contact with the disconnect screw 36 when the screw has been partially tightened onto it. A test wire may be clipped to the test connection bar 42, or a screw or binding post connection may be provided if preferred.

An important feature of this test arrangement is that in this position the screw 36 exerts a compressional force just as it does in the position shown in Figure 2. In the present instance it draws test bar 42 and inner terminal strap 32 toward each other, the two being separated by a bar or pillar-like portion 46 of the molded bakelite.

It should be understood that there ordinarily will be provided four identical sets of conductors as shown, each set comprising an outer terminal strap 22 with clamp casing and screws 24 and 26, an inner terminal strap 32, a disconnect screw 36, an insulating bar 38, and such other parts, including the crimped washer 40, as may be necessary in view of the particular materials used, and under any special circumstances. It must also be realized that some of these features, such as the clamping means 24 and 26 are not new with the present invention, and may be eliminated or replaced by suitable other means. For convenience the outer terminal straps 22 may be welded or otherwise secured to clamp casings 24.

Each of the inner terminal straps 32 may be connected either directly or indirectly to suitable coils within the meter element according to well known principles. Although it is not necessary to go into detail in this, a typical connection may be briefly explained. If the meter is used in a three-wire circuit, one current coil may be connected to the first and fourth connecting bars, and the other current coil may be connected to the second and third connecting bars. The potential coil could then be connected directly to the first and second connecting bars, but for reasons which are explained in detail hereinafter, it may be preferred to provide one or more special connections between the potential coil and one or both of the line wires. Usually a special connection will be desired between the potential coil and the first of the line wires.

Such special connection is secured through the potential connecting strap 48 which is connected with the horizontal bar 50, preferably by a slot and screw 52 as indicated in Figure 1. The bar 50 is connected to the clamp casing 24 by a screw 54. It may be mentioned that since only an extremely small current is carried by the potential coil it is not necessary to use heavy conductors for the connection just described, nor is it necessary that contact pressures be extremely high or other resistances extremely low. The potential connecting strap 48 may be inserted into the inner terminal block 14 either through upwardly opening slots, as in the case of the inner terminal straps 32, or, since there are no conflicting metallic parts this potential connecting strap 48 may be positioned as shown in Figure 9, in which case it may be either formed in one piece and molded into the bakelite, or it may be formed n two pieces 48 and 48' as shown.

The inner terminal block 14 may be secured directly to the meter base 10, as by suitable vertically extending screws 55 in slots 56, the outer terminal block having a larger slot 58 therein to permit the passage of such a screw therethrough. To prevent tampering with these screws 55, lugs 59 may be provided on the pull box, to fit into and substantially close the slot 58.

It is preferred that the outer terminal block 16 be separately supported in order to facilitate the separation of the meter and the inner terminal block 14 therefrom. For this purpose the screws 60 may be passed through the hole 62 in the outer terminal block. The heads of screws 60 should bear against the bakelite wall forming the end of hole 62 and press the outer terminal block firmly in position, against either the meter base or the supporting wall.

To insure the proper positioning of the inner terminal straps 32 and to insulate them from one another, ribs 64 may be provided which preferably extend to the plane of the front faces of the portion of the terminal straps in contact therewith. If desired, some or all of these ribs may project even further, as illustrated in the case of the ribs 66. Of course the straps could be entirely surrounded by bakelite if desired, but this is not necessary. In Figure 2 it will be observed that the straps 32 are provided with forwardly positioned portions which are substantially flush with the faces of the inner terminal block. These faces can be covered by bakelite if the space in the meter base permits, but in order to conserve space it is preferred that they be separated and insulated from the meter base by a sheet of high grade insulating paper 68. It may be explained that the meter bases are now formed with depressions 70 to receive a glass cover 72 as shown in Fig. 1.

It will be noted from Fig. 2 that at the point 71 between the inner terminal strap 32 and the outer terminal strap 22 the two terminal straps are spaced apart, but the space is not filled with insulation. This space could be filled up in the original molding of the block if desired, but at the present time it is preferred that the space be left open so that a single straight continuous terminal bar may be used in place of the disconnect features when the disconnect features are not desired. It may be explained further that for commercial reasons it may be desirable to produce meters without the disconnect features, as well as meters with the disconnect features. It is desirable, however, to use the same molded bakelite connection block (referring to the empty frame only) so that a meter can be converted to a disconnect type whenever desired and for reasons of economy. In using a connection block without the disconnect features it is merely necessary to omit the inner terminal strap 32 and the screw 36 and to substitute for the short outer terminal strap 22 a strap similar thereto but enough longer to extend to the present position of the upper end of the inner terminal strap 32, the screw 34 screwing directly into the extended form of terminal strap 22. It may be further explained that with such an arrangement it is preferred that the extended strap 22 should not be welded to the clamp casing 24, so that when the screw 26 is loosened the extended strap 22 may be drawn out of the clamp casing as the meter is raised from its normal position for the purpose of removal, leaving the outer terminal block in place on the wall.

As previously mentioned the meter may be removed while leaving the outer terminal block in place. The ease of this removal is one of the important features of this invention. To accomplish this removal the screws 36 are unscrewed at least to the positions shown in Fig. 5, and screw 52 and any other screws which would restrain the meter are loosened or removed. The meter and its base and the inner terminal block are then lifted vertically as shown in Fig. 5, and may be completely removed. The outer terminal block continues to be supported by screws 60, and if desired an insulating cap may be provided for covering over the upstanding ends of straps 22. To permit removal of the base without removing the screws 60 the base may be provided with suitable downwardly opening slots 72.

Operation

The operation of this invention is quite simple. The connecting straps 32 will be properly connected to the meter element by the manufacturer, so that in installing the meter it will merely be necessary to suitably mount it and to insert the line wires and the load wires into proper conductor holes 20 and clamp them against the terminal straps 22 by tightening the screws 26.

In testing the meter it is merely necessary to disconnect the proper terminals and to properly connect the test wires. The disconnection is accomplished simply by unscrewing the corresponding disconnect screws 36 until they thrust their heads outside of the inner terminal block 14, at which time they will be thoroughly separated from the outer terminal straps 22 and therefore disconnected from load wires 28. To attach the test wires a test disconnecting bar 42 is inserted under the head of each of these disconnect screws 36 which has thus been screwed out, and then the screw 36 is screwed in until it clamps the test connection bar in place. The test wires may then be clipped or otherwise secured to the test connection bars and through them, and screws 36 and inner terminal straps 32 to the meter. When the test is over, the test connection bars are removed by loosening the screws 36 which hold them, and these screws 36 are then tightened firmly so that a high contact pressure is attained.

It may be explained that in either position of screw 36, the size of the contact area is comparatively unimportant if the contact pressure is sufficiently high to approximate the condition of a continuous conductor.

There are various ways of testing meters, but for the sake of illustration only two will be explained. It may first be explained that it is common practice before a meter in service is tested to connect jumpers 80 and 81 across in such way as to continue the service even though the meter may be disconnected. With the meter arrangement assumed in the present application, the jumper 80 would be connected to the first and fourth of the outer terminal straps 22, and the jumper 81 would be connected to the second and third of the outer terminal straps 22, as illustrated in each of the Figures 10 to 12. As a matter of routine, these jumpers would be connected to the heads of the screws 26 and may be attached thereto either by universal spring test clips, which may engage the screws in the slot 82, or, if the jumpers are in the forms of bars, they might be attached to the screws 26 by being screwed thereto by small screws, as illustrated in prior Patent 1,906,927. Whatever the form of the jumpers, some provision will be made for attaching to each a test wire for the purposes to be described.

In Figure 10 is illustrated the resistance load testing of a three-wire meter such as is illustrated in the preceding figures of the application. This is one of the simplest forms of test and is here disclosed chiefly to facilitate an understanding of test procedure in general, and for illustrating one of the simplest ways in which the disconnect screws 36 are used. After the jumpers 80 and 81 have been connected the third and fourth disconnect screws 36 are unscrewed to disconnect the corresponding outer terminal strap 22 from the associated inner terminal straps 32, after which test bars 42 are slipped under the heads of the said screws 36 and these screws tightened upon the test bars 42. To the test bars 42 are connected wires 84 which are connected at their other ends to the current coil 86 of a standard meter. In one of the wires 84 may be imposed a variable resistance unit 88. The load circuit thus formed is shown with a serrated line for the sake of clarity, and it will be seen that it flows from the line wire $L_1$ through the first pair of terminal straps 22 and 32 connected by screw 36, through current coil 90 of the meter to be tested, through the fourth inner terminal strap 32, screw 36 and test bar 42, through variable resistance 88, through current coil 86 of the standard meter, through the third inner terminal strap 32, by way of the associated screw 36 and test bar 42, through the other current coil 92 of the meter to be tested and through the second pair of terminal straps 32 and 22 connected by the associated screw 36 back to line wire $L_3$. It is thus seen that all the current which flows through the current coils 90 and 92 of the meter to be tested flows also through current coil 86 of the standard meter, and that this current can be varied through regulating the resistance 88. It will be noted that no change has been made in the connection of the voltage or potential coil 94 of the meter to be tested, which is connected as always across the lines L1 and L3. The potential coil 96 of the standard meter is likewise connected across the line wires L1 and L3 by the wires 98 which are connected to the jumpers 80 and 81, which are connected through the first and second outer terminal straps to the line wires L1 and L3. It should be obvious that since the potential coils of the two meters are connected across the same lines, and since the same current which flows through the current coils of the meter being tested must also flow through the current coil of the standard meter that a comparison of the two movements of the two meters will indicate the accuracy of the meter being tested.

It will be noted that with the resistance load testing shown in Figure 10 the load current is at full voltage, being taken directly from line wires L1 and L3. This necessarily results in a considerable power consumption and consequently requires a high heat dissipation in the resistance 88 to prevent its being overheated. In Figure 11 is illustrated what is called a phantom load testing for the same three-wire meter. By phantom load is meant a load which though of the desired current value, has a low potential or voltage value, and therefore uses little power and generates only a small amount of heat.

In this phantom load testing shown in Figure 11 the potential coil 96 of the standard meter is connected across lines L1 and L3 by wires 98 which connect with the jumpers 80 and 81, as in Figure 10. Also connected across the lines L1 and L3 through wires 98 is a primary coil 100 of a simple transformer for reducing voltage. The secondary coil 102 of this transformer supplies the current for the load coils of the meters, and since it is necessary that this current be the only current present in the current coils, all four pairs of terminal straps 22 and 32 are disconnected by unscrewing the disconnect screws 36 in the manner previously described. Test bars 42 are connected to all four inner terminal straps 32 also as previously described. The third and fourth test bars 42 are connected to one another by a jumper 104. The first and second test bars 42 are connected by wires 106 with the secondary coil 102 of the transformer, a variable resistance 88 and the current coil 86 of the standard meter all in series, as illustrated. From the primary coil there is thus formed a load circuit, shown by the serrated line, which passes from the secondary transformer coil 102 through the wire 106, through the second test bar 42 and screw 36, through the inner terminal strap 32, through the current coil 92 of the meter to be tested, through the third inner terminal strap 32, screw 36 and test bar 42, through jumper 104, through the fourth test bar 42, screw 36 and inner terminal strap 32, through the other current coil 90 of the meter to be tested, through the first terminal strap 32, screw 36 and test bar 42, through wire 106, through the current coil 86 of the standard meter, through the variable resistance 88, and back to the secondary transformer coil 102.

This brings us to the manner of connecting the potential coil 94 of the meter to be tested across the lines L1 and L3. According to the prior art, this coil was usually connected on the inside of the disconnect points for the first two terminals, that is, to such elements in the prior art as might be said to generally correspond with the first and second inner terminal straps 32. It should be obvious, however, that such connection makes a phantom load testing quite difficult, for both of these terminal straps are disconnected from the line wires during phantom load testing for the reasons explained, and, furthermore, if full line voltage were supplied to the potential coil 94 while it was connected to the first and second terminal straps 32 and while the jumper 104 connected the two current coils 90 and 92, there would be a short circuit at full line voltage through said two current coils. An important feature of the present invention, therefore, is the connection of one of the potential coil leads (wire 108) to one of the line wires on the line side of the disconnect screw 36, or on the line side of such disconnect provision as may be made, while connecting the other potential coil lead (the wire 109) on the inner side of the disconnect screw 36, or other disconnect point. The connection of the wire 109 may be in accordance with the prior art, and the connection of the wire 108 is preferably through the potential strap 48 and 48', the link 50 and the screw 54, which structure has already been described. This structure has the advantage that it not only provides the connection beyond the disconnect point, but it provides it in a compact manner and without preventing the separation of the inner and outer terminal blocks when the meter is to be removed.

In Figures 10 to 12 the potential strap 48 and its associated parts have been illustrated diagrammatically with the reference numerals 48 and 50 applied thereto. In Figure 11 the full connection of the potential coil 94 across the lines L1 and L3 may be traced from the line L1 to the first outer terminal strap 32, through link 50 and the potential strap 48, through the lead wire 108, through the potential coil 94, through the lead wire 109, through the second inner terminal strap 32, screw 36 and test bar 42, through the associated wire 106, through a special connecting wire 110, through one of the wires 98 to the jumper 81, and from it through the second outer terminal strap 22 to the line wire L3. It may be noted that the wire 109 could be connected on the line side of the disconnect screw 36 if for any reason this were preferred, but the connection shown is usually preferred, since when the meter is to be disconnected for any reason, the unscrewing of the second screw 36 will disconnect the potential coil 94.

Figure 12 illustrates the importance of using terminal strap 48 and its associated parts for connecting the one lead of the potential coil 94 to the line side of the disconnect point when phantom load testing is used with a two-wire meter. It is noted that this diagram is substantially the same as Figure 11, except that the second current coil 92 is not present in the meter being tested, and therefore the phantom load circuit which is shown by a serrated line is somewhat simpler, and since the second and third disconnect screws 36 need not be loosened, there happens to be no need for connecting wire 110, which has therefore been shown in dotted lines in this figure. The circuit for the potential coil 94 may be traced from line L1 through the first outer terminal strap 22 to link 50, to potential strap 48, the lead 108, the potential coil 94, the lead 109, the second inner terminal strap 32, screw 36 and the outer terminal strap 22, to the line wire L2. Here, as in Figure 11, the potential coil may be disconnected from its ordinary circuit by the loosening of the second disconnect screw 36.

For the sake of completing the description of Figure 12, it may be noted that the potential coil 96 of the standard meter is connected to the jumpers 80 and 81 through the wires 99. Also the primary coil is connected in like manner through these wires 99. The phantom load circuit may be traced briefly from the secondary transformer coil 102 through the wire 106, through the first disconnect screw 36 and its associated parts, through current coil 90 of the meter to be tested, through the fourth disconnect screw 36 and its associated parts, through the wire 106, through the current coil 86 of the standard meter, and through the variable resistance 88 back to the secondary transformer coil 102.

From the foregoing it is seen that this invention provides the combination of a meter base having a standard size terminal chamber and a connection block adapted to fit said chamber and embodying disconnect features while at the same time meeting the rigid requirements of simplicity, high contact pressure, inexpensiveness of construction, and foolproof characteristics of operation, as well as separability so that the meter and upper portion of the connecting block may be separated from the wires and lower portion of the connecting block. There may also be provided an independent potential connection to facilitate testing.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. The combination of a watthour meter base having a terminal chamber and a connecting block therein; said connecting block including an outer terminal strap for connection with the measured circuit, and an inner terminal strap connected with the meter element, said terminal straps having aligned threaded holes therein, and a headed screw normally extending through one of said terminal straps and engaging said strap with its head but not with threads, and screwing into the other of said terminal straps and engaging both of said terminal straps with high contact pressure, said terminal straps being electrically separated from one another except for said screw.

2. The combination of a watthour meter base having a terminal chamber and a connecting block therein; said connecting block including an outer terminal strap for connection with the measured circuit, and an inner terminal strap connected with the meter element, said terminal straps having aligned threaded holes therein, and a headed screw normally extending through one of said terminal straps and engaging said strap with its head but not with threads, and screwing into the other of said terminal straps and engaging both of said terminal straps with high contact pressure, said terminal straps being electrically separated from one another except for said screw, and said screw being arranged so that by a screwing engagement with one of said terminal straps it may be drawn away from the other of said terminal straps.

3. The combination of a watthour meter base having a terminal chamber and a connecting block therein; said connecting block including an outer terminal strap for connection with the measured circuit, and an inner terminal strap connected with the meter element, said terminal straps having aligned threaded holes therein, and a headed screw normally extending through one of said terminal straps and engaging said strap with its head but not with threads, and screwing into the other of said terminal straps and engaging both of said terminal straps with high contact pressure, said terminal straps being electrically separated from one another except for said screw, both of said straps being threaded and said screw being so constructed and of such length that it may be passed from one to the other of said straps by a screwing action.

4. The combination of a meter base having a terminal chamber and a connecting block therein, said connecting block including a pair of overlapping terminal straps and a screw normally screwed into one of said terminal straps and contacting the other of said terminal straps and engaging both of said terminal straps with high contact pressure, said terminal straps being electrically separated from one another except for said screw, and said screw being arranged so that by a screwing engagement with one of said terminal straps it may be drawn away from the other of said terminal straps, and insulation surrounding said screw to make it normally inaccessible except at the top face of its head.

5. The combination of a meter base having a terminal chamber and a connecting block therein, said connecting block including a pair of overlapping terminal straps and a screw normally screwed into one of said terminal straps and contacting the other of said terminal straps and engaging both of said terminal straps with high contact pressure, said terminal straps being electrically separated from one another except for said screw, and said screw being arranged so that by a screwing engagement with a given one of said terminal straps it may be drawn away from the other of said terminal straps, and insulation closely surrounding said screw and its head to make it embedded below the surface of the insulation when it is in contact with both of said terminal straps to make further electrical connection with it difficult; said screw being long enough to project its entire head beyond said insulation while used in a screwing engagement with said given terminal strap whereby a test connecting bar may be placed between the head of said screw and said last named insulation.

6. The combination of a meter base having a terminal chamber and a connecting block therein, said connecting block including a pair of overlapping conductor straps and a screw normally screwed into one of said conductor straps and contacting the other of said conductor straps and engaging both of said conductor straps with high contact pressure, said conductor straps being electrically separated from one another except for said screw, and said screw being arranged so that by a screwing engagement with one of said conductor straps it may be drawn away from the other of said conductor straps; said connecting block being formed of two separable parts, each part when separated including one of said conductor straps.

7. The combination of a meter having a current coil and a potential coil, and a meter base having a terminal chamber and a connecting block therein, said connecting block including a pair of overlapping conductor straps and a screw normally screwed into one of said conductor straps and contacting the other of said conductor straps and engaging both of said conductor straps with high contact pressure, said conductor straps being electrically separated from one another except for said screw, and said screw being arranged so that by a screwing engagement with one of said conductor straps it may be drawn away from the other of said conductor straps; said connecting block being formed of two separable parts, each part when separated including one of said conductor straps; said connecting block including other conductor units, and said current coil being connected to one of said overlapping conductor straps and to one of said other conductor units, and said potential coil being connected to the other of said overlapping conductor straps and to another conductor unit, the connection between said potential coil and said other conductor strap being formed of two parts separable in such manner as not to interfere with the separation of the two parts of said connecting block.

8. The combination of a watthour meter base having a terminal chamber and a connecting block therein; said connecting block including an outer terminal strap for connection with the measured circuit, an inner terminal strap connected with the meter element, said terminal straps having aligned holes therein, a headed screw normally extending through one of said terminal straps and engaging said strap with its head but not with threads, and screwing into the other of said terminal straps and engaging both of said terminal straps with high contact pressure, said terminal straps being electrically separated from one another except for said screw.

9. The combination of a watthour meter base having a terminal chamber and a connecting block therein, said connecting block including an outer terminal strap for connection with the measured circuit, an inner terminal strap connected with the meter element, said terminal straps having aligned holes therein, and a headed screw normally extending through one of said terminal straps and engaging said strap with its head but not with threads and screwing into the other of said terminal straps and engaging both of said terminal straps with high contact pressure, said terminal straps being electrically separated from one another except for said screw, and a substantially rigid body of insulation between said terminal straps and so close to said screw as to receive directly as a compressioned force, the force applied to said straps by said screw.

10. A connection block for electrical devices including support means of insulation, a pair of terminal straps held in spaced relation by said support means and having aligned holes therein, and a headed screw normally extending through one of said terminal straps and engaging said strap with its head but not with threads, and screwing into the other of said terminal straps and engaging both of said terminal straps with high contact pressure, and having a screwing engagement with the first of said terminal straps when it is unscrewed from the second, said terminal straps being electrically separated from one another except for said screw.

11. A connection block for electrical devices including support means of insulation, a pair of terminal straps held in spaced relation by said support means and having aligned holes therein, a headed screw normally extending through the first of said terminal straps and engaging said strap with its head but not with threads, and screwing into the second of said terminal straps and engaging both of said terminal straps with high contact pressure, and having a screwing engagement with the first of said terminal straps when it is unscrewed from the second, said terminal straps being electrically separated from one another except for said screw, and said insulation including a ceramic portion between said terminal straps and so close to said screw as to receive directly as a compressional force the force applied to said straps by said screw.

12. The combination of a watthour meter base having a terminal chamber and a connecting block therein, said connecting block including insulating means, an outer terminal strap held by said insulating means for connection with the measured circuit, an inner terminal strap held by said insulating means in spaced relation with respect to said outer terminal strap and connected with the meter element, and screw-tightened connecting means engaging both of said straps with high contact pressure but disconnectable from one of said straps, said insulating means maintaining said straps separated and being subject to a compressional force only.

13. The combination of a watt-hour meter having a current coil and a potential coil, and a connection block assembled therewith, said connection block including at least three conductor units, at least one of which includes an outer end for connection to a line wire, an inner end and a disconnect device for causing an electrical break in said conductor unit between its ends, said current coil being connected to the inner end of said disconnect conductor unit and to one of said other conductor units, and said potential coil being normally connected to a third conductor unit and to the outer end of said disconnect conductor unit whereby it is connected to said line wire through the outer end of said disconnect conductor unit but not through said disconnect device.

14. The combination of a watt-hour meter having a current coil and a potential coil, and a connection block assembled therewith, said connection block including at least three conductor units, at least two of which each includes an outer end for connection to a line wire, an inner end and a disconnect device for causing an electrical break in said conductor unit between its ends, said current coil being connected to the inner end of at least one of said disconnect conductor units and to one of said other conductor units, and said potential coil being normally connected on the inner end of another disconnect conductor unit and to the outer end of the disconnect conductor unit to which the current coil is connected whereby it is connected to said line wire through the outer end of said disconnect conductor unit but not through said disconnect device.

15. The combination of a watt-hour meter base having a terminal chamber and a connecting block therein, said connecting block including an outer terminal strap for connection with the measured circuit, an inner terminal strap connected with the meter element, said terminal straps having aligned holes therein, and a headed screw normally extending through one of said terminal straps and engaging said strap with its head but not with threads and screwing into the other of said terminal straps and engaging both of said terminal straps with high contact pressure, said terminal straps being electrically separated from one another except for said screw, and a body of ceramic insulation between said terminal straps and so close to said screw as to receive directly as a compressioned force, the force applied to said straps by said screw.

16. The combination of a meter base having a terminal chamber and a connecting block therein, said connecting block including a pair of overlapping terminal straps and a screw normally screwed into one of said terminal straps and contacting the other of said terminal straps and engaging both of said terminal straps with high contact pressure, said terminal straps being electrically separated from one another except for said screw, and said screw being arranged so that by a screwing engagement with a given one of said terminal straps it may be drawn away from the other of said terminal straps, and insulation surrounding said screw to make it normally inaccessible except at the top face of its head; said screw being long enough to project its entire head beyond said insulation while used in a screwing engagement with said given terminal strap whereby a test connecting bar may be placed between the head of said screw and said last named insulation, and being short enough to clamp said test connecting bar against said insulation while still being spaced from the terminal strap from which the screw was withdrawn.

FREDERICK HOLMES.
STANLEY S. GREEN.